US006941747B1

(12) United States Patent
Houston et al.

(10) Patent No.: US 6,941,747 B1
(45) Date of Patent: Sep. 13, 2005

(54) EXHAUST GAS TREATMENT METHOD AND DEVICE

(75) Inventors: Rodney Alexander Houston, Woodvale (AU); Koon Chul Yang, Woodvale (AU); David Richard Worth, Shenton Park (AU); Geoffrey Paul Cathcart, Yonkin (AU); Michael Moore, Subiaco (AU)

(73) Assignee: Orbital Engine Company (Australia) PTY Limited, Balcatta (AU)

( * ) Notice: Subject to any disclaimer, the term of this patent is extended or adjusted under 35 U.S.C. 154(b) by 55 days.

(21) Appl. No.: 10/070,688

(22) PCT Filed: Sep. 8, 2000

(86) PCT No.: PCT/AU00/01064

§ 371 (c)(1), (2), (4) Date: Jun. 13, 2002

(87) PCT Pub. No.: WO01/18374

PCT Pub. Date: Mar. 15, 2001

(30) Foreign Application Priority Data

Sep. 8, 1999 (AU) ............................................. PQ2722

(51) Int. Cl.[7] ................................................. F01N 3/00
(52) U.S. Cl. ............................. 60/295; 60/274; 60/301
(58) Field of Search .......................... 60/274, 285, 295, 60/301, 276, 299

(56) References Cited

U.S. PATENT DOCUMENTS 5,125,231 A * 6/1992 Patil et al. .................... 60/274
5,778,666 A 7/1998 Cullen et al.
5,953,907 A * 9/1999 Kato et al. .................... 60/274
6,173,570 B1 * 1/2001 Mitsumoto et al. ........... 60/301
6,345,499 B1 * 2/2002 Nishimura et al. ........... 60/277
6,413,483 B1 * 7/2002 Brisley et al. ........... 423/239.1
6,421,599 B1 * 7/2002 Lippa et al. ................ 701/102
6,499,294 B1 * 12/2002 Katoh et al. .................. 60/301
6,536,210 B1 * 3/2003 Komoriya et al. ............ 60/301

FOREIGN PATENT DOCUMENTS

| | | |
|---|---|---|
| DE | 19807203 | 8/1999 |
| JP | 2000-87788 | 3/2000 |
| WO | WO 9901648 | 1/1999 |

OTHER PUBLICATIONS

Derwent Abstract Accession No. 2000–287338/25, JP 2000080913 A (Toyota Jidosha KK) Mar. 21, 2000 Abstract.

* cited by examiner

*Primary Examiner*—Thomas Denion
*Assistant Examiner*—Diem Tran
(74) *Attorney, Agent, or Firm*—Rothwell, Figg, Ernst & Manbeck

(57) ABSTRACT

A method of treating NOx emmissions in the exhaust gas of an internal combustion engine having catalyst means including at least a first catalyst converter capable of treating NOx, the method including operating the engine in a first mode to promote a first set of conditions and in a second mode to promote a second set of conditions, wherein the first mode of operation includes operating the engine with a lean air-fuel ratio, and the second mode of operation includes operating the engine with a stoichiometic air-fuel ratio.

57 Claims, 5 Drawing Sheets

EXHAUST GAS TREATMENT METHOD AND DEVICE

This invention relates to the treatment of oxides of nitrogen within the exhaust gas emissions of internal combustion engines, and in particular to a method of operating an internal combustion engine to allow such treatment.

The recent and future introduction of increasingly strict internal combustion engine emissions legislation around the world, particularly as this relates to automotive vehicles, has resulted in increasing pressure on engine and vehicle manufacturers to reduce engine emissions, particularly hydrocarbon (HC), carbon monoxide (CO), and oxides of nitrogen (NOx) emissions. These emissions are generally treated by a catalytic converter in the exhaust system of the engine, which is intended to convert these potentially harmful gases into preferred substances such as carbon dioxide, nitrogen, oxygen, and water.

NOx emissions present particular challenges for engine and vehicle manufacturers in that typical catalytic converters have been found to be less effective when the engine is operating under lean burn conditions. This is particularly a problem in engines which derive efficiency advantages from lean burn operation, and in particular, stratified charge engines, such as some of those incorporating the Applicant's dual fluid fuel injection system.

Dual fluid fuel injection systems typically utilise compressed gas during each injection event to entrain and atomise a metered quantity of fuel for delivery into the combustion chambers of an internal combustion engine. The Applicant has developed such fuel injection systems and one version thereof is described in the Applicant's U.S. Pat. No. 4,934,329, the details of which are incorporated herein by reference. Generally, a source of compressed gas, for example an air compressor, is required for these fuel injection systems to operate satisfactorily. The term "air" is used herein to refer not only to atmospheric air, but also to other gases including air and exhaust gas or fuel vapour mixtures. In operation, such dual fluid fuel injection systems typically rely on the existence of a differential pressure between the fuel which is metered for subsequent delivery and the compressed gas, typically air, which is used to deliver the fuel to the engine. In this regard, it is normal that the fuel pressure is slightly higher than the air pressure such that the fuel may be metered into a volume of compressed gas in a manner akin to that described in U.S. Pat. No. 4,934,329.

PRIOR ART

Various methods of engine operation and engine exhaust systems have been proposed to overcome the problem of NOx emissions. One known example, set out in U.S. Pat. No. 5,433,074, proposes the use of a specific NOx adsorbent layer in the catalyst. This layer or coating is intended to absorb NOx emissions under typical low NOx conversion conditions (that is, during lean burn operation of the engine) and release the absorbed NOx under typical high NOx conversion conditions (that is, during richer than stoichiometric operation of the engine). The adsorbent layer is a NOx adsorbent material including Barium (Ba).

However fuel economy in a system utilising such catalysts can be it compromised by the requirement of periodic "flushing" of the system with a rich air-fuel mixture. Further, in order to ensure effective operation of the system, additional sensors may be required to provide feedback to the engine controller for the purpose of determining whether "flushing" is required. The system may also be temperature sensitive, and damage to the adsorbent layer may occur at temperatures above 750-degrees Celsius, whilst effective operation of the storage capacity may be limited to a window of around 300 to 550 degrees Celsius.

SUMMARY OF THE INVENTION

It is the aim of this invention to provide an alternative NOx treatment method and device, which overcomes at least some of the disadvantages of the prior art systems.

In accordance with a first aspect of the present invention, there is provided a method of treating NOx emissions in the exhaust gas of an internal combustion engine having catalyst means including at least a first catalyst converter capable of treating NOx, the method including operating the engine in a first mode to promote a first set of conditions and in a second mode to promote a second set of conditions, wherein the first mode of operation includes operating the engine with a lean air-fuel ratio, and the second mode of operation includes operating the engine with a stoichiometric air-fuel ratio, the method further including controlling the operation of the engine during the first mode so as to promote a selective catalyst NOx reduction process at the first catalytic converter.

Conveniently, the catalyst means includes a first catalyst converter arranged in an exhaust system of the engine. Preferably, the first set of conditions include exhaust gases with lean air-fuel ratio and lower relative temperatures. Conveniently, the second set of conditions include exhaust gases with a stoichiometric air fuel ratio. In many cases, the second set of conditions will include higher relative exhaust gas temperatures. Preferably, the exhaust gas temperatures produced by the engine while it operates under the first mode of operation are in the range 200 to 400 degrees Celsius. Preferably, the exhaust gas temperatures produced by the engine while it operates under the second mode of operation are greater than 200 degrees Celsius, and typically the exhaust gas temperature are greater than 400 degrees Celsius. Preferably the relevant exhaust temperature is that of the exhaust gas at the first catalytic converter. Preferably the temperature of the exhaust gas is controlled by way of appropriate operation of the engine to ensure effective operation of the first catalytic converter under the first mode of operation. Preferably the temperature of the exhaust gas in this case is controlled to be within the range 200 to 400 degrees Celsius. Preferably the temperature of the exhaust gas is controlled by way of appropriate operation of the engine to ensure effective operation of the first catalytic converter under the second mode of operation. Preferably the temperature of the exhaust gas In this case is to be greater than approximately 400 degrees Celsius. Conveniently, the operation of the engine is controlled during the first mode so as to generate the exhaust gas emissions having characteristics that can support acceptable levels of $_{Nox}$ conversion within the first catalytic converter.

Preferably the first catalytic converter includes a combination of Pt (or Pd), Rh and Ba elements. Preferably, the first catalytic converter comprises a greater proportion of Pt (ie: it is "Pt rich") than would be expected in a typical three way catalyst. Preferably the ratio of Pt to Rh in the first catalytic converter is 10:1. Preferably, the proportion of Ba in the first catalyst converter is relatively low as compared to the proportions of Pt and Rh. The operation of the engine during the first mode is controlled so as to promote a selective catalyst reduction process at the first catalytic converter which is normally not supported during lean burn operation. The composition of the first catalytic converter is preferably slightly different to that expected in a typical three way catalyst comprising pt (or Pd) and Rh. Conveniently, the subtle difference in the composition of the first catalyst converter together with the promotion of the first set of conditions during the first mode enable the achievement of higher NOx emission efficiencies than would otherwise be expected form a typical three way catalyst during the said first mode of operation.

Conveniently, the operation of the engine is controlled during the second mode so as to promote high NOx conversion efficiency levels within the first catalytic converter.

Preferably a temperature sensing device is provided in the exhaust system of the internal combustion engine, and the output from the temperature sensing device is used to determine the mode of operation of the internal combustion engine. Preferably a sensed temperature of between 200 and 400 degrees Celsius will result in operation of the engine under the first mode of operation. Preferably a sensed temperature of greater than 400 degrees Celsius will result in operation of the engine under the second mode of operation. This latter mode of operation will typically equate to high engine load operating conditions wherein the temperatures of the exhaust gas are usually higher than during lean burn operation.

Preferably the first catalytic converter is provided in the exhaust system at a position sufficiently downstream of the internal combustion engine that the exhaust gas is allowed to cool somewhat before entering the first catalytic converter.

Preferably a second catalytic converter is provided in a close coupled configuration with the internal combustion engine for the purpose of oxidising hydrocarbon and carbon monoxide emissions in the engine exhaust gases. Preferably the first catalytic converter is a three way catalyst. Conveniently, the engine is direct injected. Preferably, fuel injection to the engine is effected by way of a two fluid fuel injection system, According to another aspect of the present invention, there is provided an engine exhaust system for treating NOx emissions in the exhaust gas of an internal combustion engine, including catalyst means having at least a first catalyst converter capable of treating NOx, wherein the engine exhaust system is adapted to at least selectively reduce a portion of the NOx emissions when the engine is operated in a first mode and a first set of conditions are promoted, and the first mode of operation includes operating the engine with a lean air-fuel ratio.

According to a further aspect of the present invention, there is provided an electronic control unit for controlling an internal combustion engine having catalyst means including at least a first catalyst converter capable of treating NOx, the electronic control unit operating the engine in a first mode to promote a first set of conditions and in a second mode to promote a second set of conditions, wherein the first mode of operation includes operating the engine with a lean air-fuel ratio, and the second mode of operation includes operating the engine with a stoichiometric air-fuel ratio to thereby treat NOx emissions in the exhaust gas of the engine.

According to yet another aspect of the present invention, there is provided an internal combustion engine for use with an exhaust treatment system having reversible NOx adsorbent capability, said engine having a fuel injection system which facilitates operation of said engine with a plurality of air fuel ratios in a range between lean and rich and said engine having an electronic controller for controlling operation of said engine and for selecting between said air fuel ratios, wherein said selection is not directly dependent on the amount of NOx stored or calculated to be stored in said exhaust treatment system.

According to a further aspect of the present invention, there is provided an internal combustion engine and exhaust treatment system for a vehicle, said exhaust treatment system having reversible NOx adsorbent capability, said engine having a fuel injection system which facilitates operation of said engine with a plurality of air fuel ratios in a range between lean and rich and said engine having an electronic controller for controlling operation of said engine and for selecting between said air fuel ratios, wherein the amount of NOx emitted by said engine to said exhaust treatment system over a Euro III drive cycle is no more than four times the Euro III requirement whereby said exhaust treatment system has emissions of NOx, carbon monoxide and hydrocarbons less than said Euro III requirement over said Euro III drive cycle.

According to another aspect of the present invention, there is provided an internal combustion engine for use with an exhaust treatment system having reversible NOx adsorbent capability, said engine having a fuel injection system which facilitates operation of said engine with a plurality of air fuel ratios in a range between lean and substantially stoichiometric and said engine having an electronic controller for controlling operation of said engine and for selecting said substantially stoichiometric air fuel ratio to purge NOx stored in said exhaust go treatment system.

According to another aspect of the present invention, there is provided an internal combustion engine and exhaust treatment system for use in a vehicle, said exhaust treatment system comprising at least one catalyst having three way conversion capability and NOx storage capability, wherein the amount of NOx emitted by said engine to said exhaust treatment system over a Euro III drive art cycle is no more than four times the Euro III requirement whereby said exhaust treatment system has emissions of NOx, carbon monoxide and hydrocarbons less than said Euro III requirement over said Euro III drive cycle, and the volume of the catalyst is less than 150% of the swept volume of said engine.

PREFERRED EMBODIMENT OF THE INVENTION

It will be convenient to further describe the invention with respect to the accompanying drawings that assist in describing various preferred embodiments of the present invention. Other embodiments of the invention are however possible, and consequently, the particularity of the accompanying drawings is not to be understood as superseding the generality of the preceding description of the invention.

Figure 1:
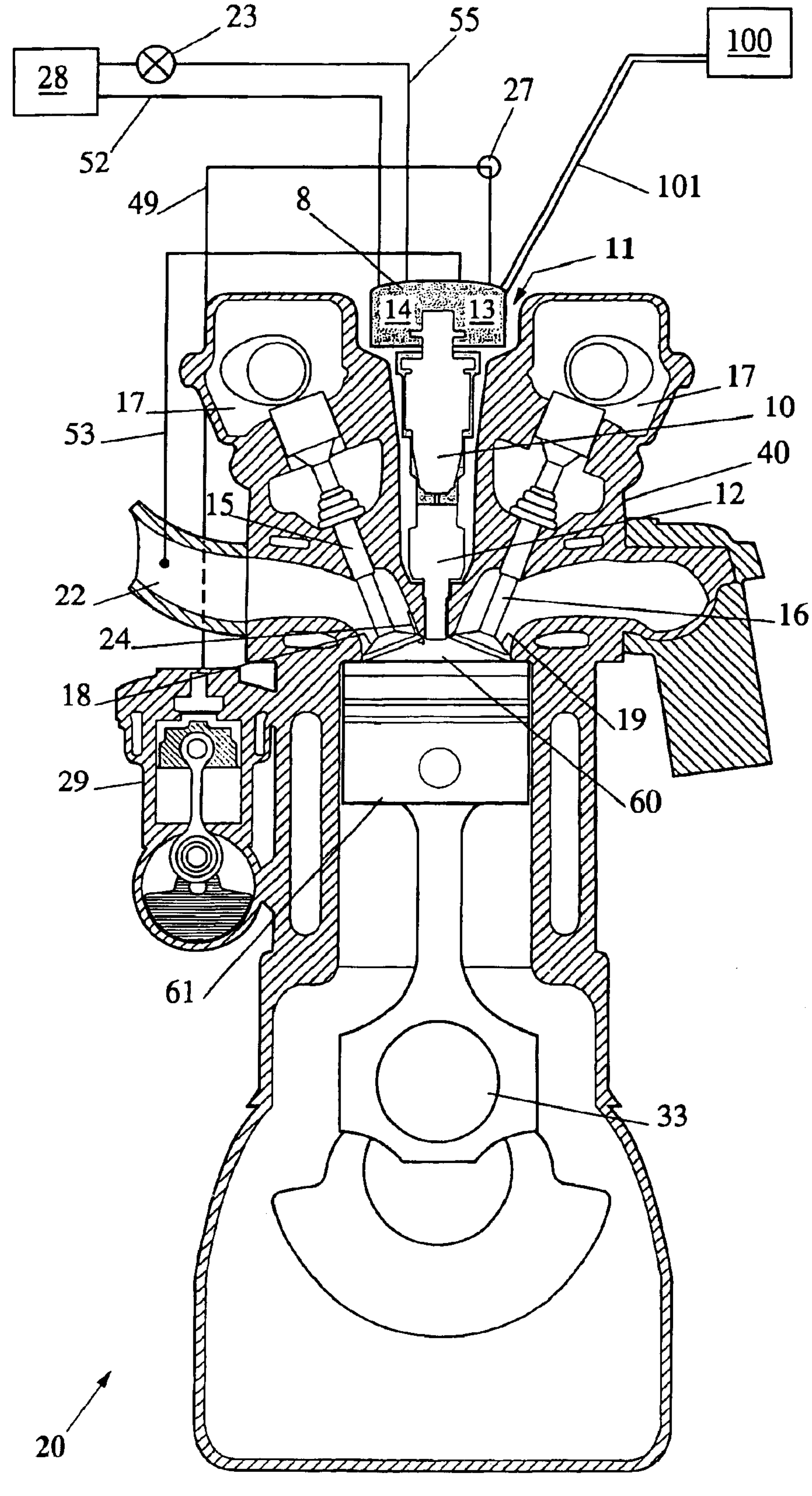
FIG. 1 is a schematic partial cross-sectional view of an internal combustion engine having a dual fluid fuel injection system operatively arranged with respect thereto.

As referred to above, emissions legislation is being introduced around the world that requires engine and vehicle manufactures to reduce the emissions produced by various types of vehicles. An example of such legislation that is applicable to Europe is commonly referred to as the Euro III and Euro IV emissions targets and should be well known to those skilled in the relevant art The Euro III and Euro IV emissions targets for passenger vehicles powered only by gasoline in respect of HC, CO and NOx emissions are:

| TEST | EMISSIONS | UNIT | EC 2000 (EURO III) | EC 2005 (EURO IV) |
|---|---|---|---|---|
| Rev. | HC | g/km | 0.2 | 0.1 |
| ECE + | NOx | | 0.15 | 0.08 |
| EUDC | CO | | 2.3 | 1.0 |

Passenger Vehicles (≦2.5 t gross vehicle weight)

To make these measurements of vehicle emissions, a vehicle is typically operated on a dynamometer. The dynamometer is caused to operate with a specific drive cycle that simulates certain real world driving conditions. Euro III and Euro IV have specific drive cycles over which the emissions referred to above are measured, these drive cycles are referred to as the ECE and the EUDC drive cycles.

The emissions that are measured are referred to as tail pipe emissions as they are emitted from the exhaust pipe (often referred to as the "tail pipe") of the vehicle. In a typical vehicle, emissions from the engine (often referred to as "engine out" emissions) are treated by an exhaust treatment system that typically utilises a catalytic converter which promotes further reduction and oxidation of engine out emissions so that the tail pipe emissions contain a greater proportion of $N_2$, $O_2$, $CO_2$, and $H_2O$ than the engine out emissions. Hence the Euro III and Euro IV emissions specify maximum levels of tail out emissions of hydrocarbons, carbon-monoxide and oxides of Nitrogen for various classes of vehicles.

It is preferable that in meeting these emissions targets that the vehicle also have a fuel economy benefit over currently available MPI (Manifold Port Injected) engines and DI (Direct Injection) engines.

The Applicant has developed certain engine which utilize a two fluid direct fuel injection system. Simple application of such fuel injection systems to four stroke engines is not, in itself, sufficient to meet these emissions targets and further refinement is required before the above emissions targets can be met. In particular it is necessary to calibrate an engine at various points on the speed load curve (for example the speed load curve detailed in FIG. 4) in order for it to meet these emission targets. Calibration however is a multi-variable, typically non-linear problem. In a direct injection engine particularly, it involves consideration of variables such as ignition timing, fuel per cycle, air fuel ratio, exhaust gas re-circulation levels, injection timings etc.

To fully understand how these emissions targets may be met by use of such a fuel system, the Applicant's two fluid fuel injection system will first be described in some detail with reference to FIGS. 1 and 2, and then a description of the application of the present invention to an engine with that fuel injection system will follow with particular reference to FIGS. 3 and 4. However, it is believed that application of the present invention need not be limited to engines with the described fuel supply system, which it will be understood is set out for the purposes of exemplification only. It may also be applicable to other engines with similar emissions capabilities as the applicants engines.

FIG. 1 shows a direct injected four stroke internal combustion engine 20 comprising a fuel injection system, the engine 20 having an air intake system 22, an ignition means 24, a fuel pump 23, and fuel reservoir 28. An air compressor 29 is operatively arranged with respect to the engine 20 and typically driven off the engine crankshaft 33 or other drivetrain by way of a suitable belt (not shown). Mounted in the cylinder head 40 of the engine 20 is a fuel and air rail unit 11. The fuel pump 23 draws fuel from the fuel reservoir 28 which is then supplied to the fuel and air rail unit 11 though a fuel supply line 55. Conventional inlet and exhaust valves 15 and 16 are also mounted in the cylinder head 40 in the known manner together with conventional cam means 17 for actuating the valves 15, 16. The valves 15, 16 are arranged to open and close corresponding inlet and exhaust ports 18 and 19 for admission of fresh air and the removal of exhaust gases from the engine cylinder in the known manner.

Figure 2:
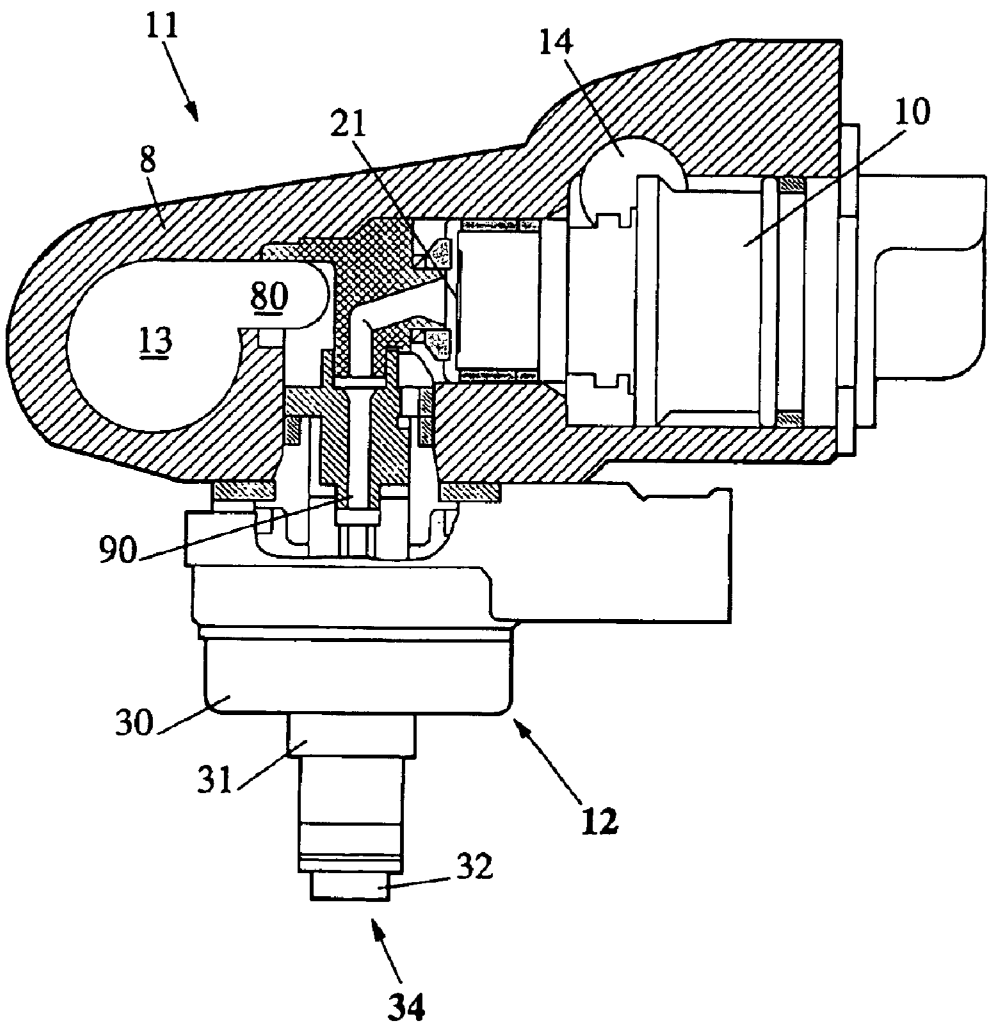
FIG. 2 is a partial cross-sectional view of one form of a fuel metering and injector rail unit.

Referring now to FIG. 2, there is shown in detail a fuel and air rail unit 11 which, whilst being different in design from that shown in FIG. 1, shares all the same components thereof. The fuel and air rail unit 11 comprises a fuel metering unit 10 and an air or delivery injector 12 for the or each cylinder of the engine 20. The fuel metering unit 10 is commercially available and requires no detailed description herein. Suitable ports are provided to allow-fuel to flow through the fuel metering unit 10 and a metering nozzle 21 is provided to deliver fuel to a passage 90 and thence to the air injector 12. The body 8 of the fuel and air rail unit 11 may be an extruded component with a longitudinally extending air duct 13 and a fuel supply duct 14.

As best seen in FIG. 1, at appropriate locations, there are provided connectors and suitable ducts communicating the rail unit 11 with air and fuel supplies: air line 49 communicating air duct 13 with the air compressor 29; air line 53 providing an air outlet which returns air to the air intake system 22; and fuel line 52 communicating the fuel supply duct 14 the fuel reservoir 28 providing a fuel return passage. The air duct 13 communicates with a suitable air regulator 27 which regulates the air pressure of the compressed air provided by the air compressor 29 to the air duct 13.

Referring again to FIG. 2, the air injector 12 has a housing 30 with a cylindrical spigot 31 projecting from a lower end thereof, the spigot 31 defining an injection port 32 communicating with passage 90. The injection port 32 includes a solenoid operated selectively openable poppet valve 34 operating in a manner similar to that as described in the Applicant's U.S. Pat. No. 4,934,329, the contents of which are hereby incorporated by reference. As best seen in FIG. 1, energisation of the solenoid in accordance with commands from an electronic control unit (ECU) 100 causes the valve 34 to open to deliver a fuel-gas mixture to a combustion chamber 60 of the engine 20. However, it is not intended to limit the valve construction to that as described above and other valves, for example, pintle valve constructions, could be employed. The electronic control unit (ECU) 100 typically receives signals indicative of crankshaft speed and airflow from suitably located sensors within the engine (not shown). The ECU 100, which may also receive signals indicative of other engine operating conditions such as the engine temperature, ambient temperature and battery voltage (not shown), determines from all input signals received the quantity of fuel required to be delivered to each of the cylinders of the engine 20. As alluded to hereinbefore, this general type of ECU is well known in the art electronically controlled fuel injection systems and will not be described herein further detail.

The opening of each injector valve 34 is cot lied by the ECU 100 via a respective communicating means 101 in timed relation to the engine cycle to effect delivery of fuel from the injection port 32 to a combustion chamber 60 of the engine 20. By virtue of the two fluid nature of the system, fuel is delivered to the cylinder entrained in a gas. The passage 90 is in constant communication with the air duct 13 via the conduit 80 as shown in FIG. 2 and thus, under normal operation, is maintained at a substantially steady air pressure. Upon energization of the solenoid of air injector 12, the valve 34 is displaced downwardly to open the injection port 32 so that a metered quantity of fuel delivered into the air injector 12 by the fuel metering unit 10 is carried by air through the injection port 32 in the combustion chamber 60 of a cylinder of the engine 20.

Typically, the air injector 12 is located within the cylinder head 40 of the engine 20, and is directly in communication with the combustion chamber 60 defined by the reciprocation of a piston 61 within the engine cylinder. As above described, when the injection port 32 is opened and the air supply available via the conduit 80 is above the pressure in the engine cylinder, air will flow from the air duct 13 through the passage 80, passage 90 and, entrained with fuel, injection port 32, into the engine combustion chamber 60.

Figure 3:
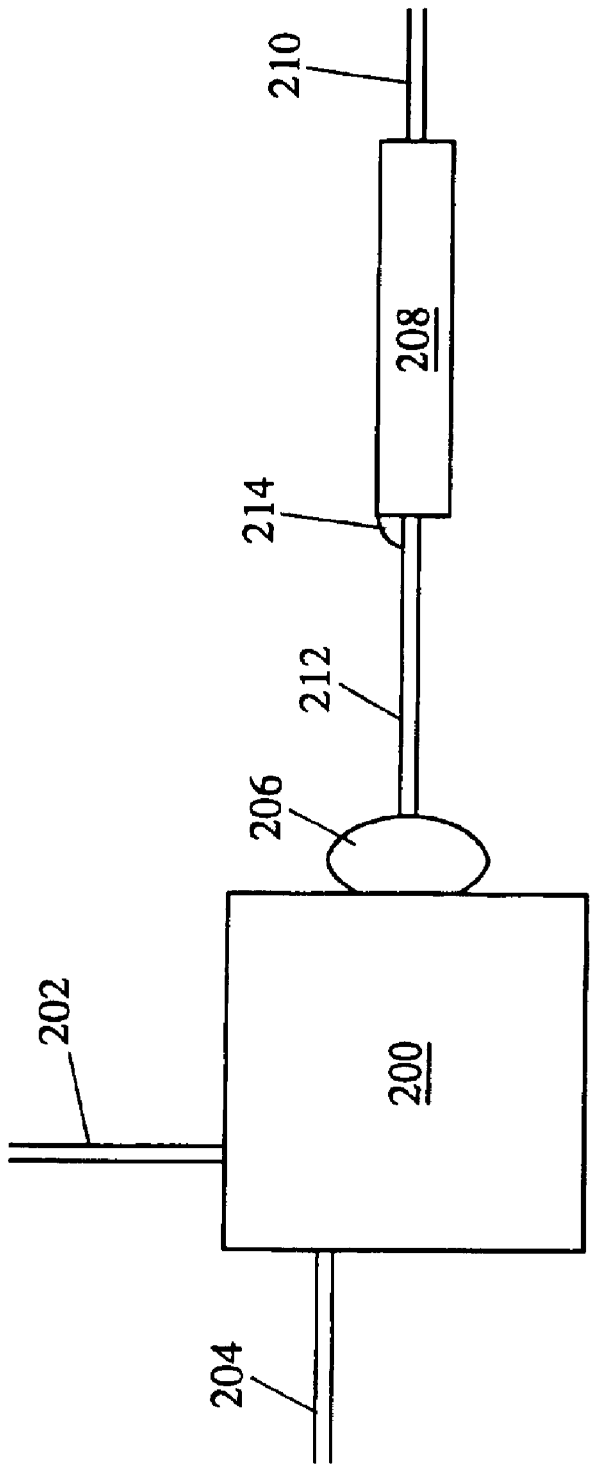
FIG. 3 is a schematic layout of an internal combustion engine and exhaust system according to an embodiment of the present invention.
Figure 4:
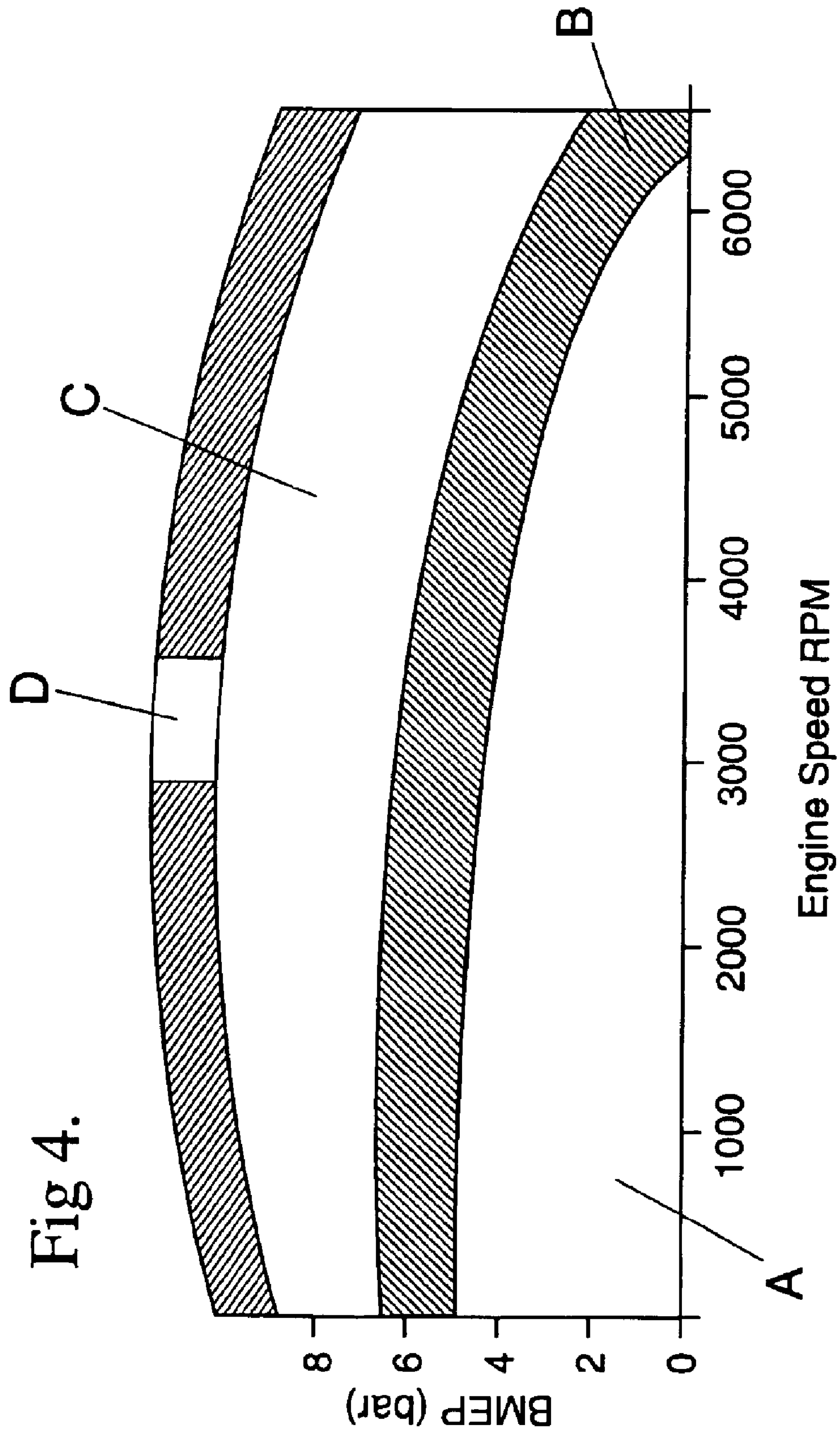
FIG. 4 is a graph showing engine load against engine speed for an engine operating in accordance with an embodiment of the present invention.

Turning now to FIG. 3, a new set of reference numerals have been adopted due to the schematic nature of this illustration. The features illustrated include engine 200, fuel intake 202, air intake 204, close coupled catalytic converter 206, main catalytic converter 208 and external exhaust outlet 210. A temperature sensor 214 is located adjacent the entry to the main catalytic converter 208.

As is usual in the operation of engine systems of this type, fuel and air are taken in through their respective intakes 202, 204. Combustion then takes place in the engine 200, and exhaust gases pass out of the engine 200. In this Figure, there is illustrated an optimal coupled catalytic converter 206 through which the exhaust gases may pass immediately as they leave the combustion chamber of the engine 200. Exhaust gases then travel along exhaust pipe 212 to the main a catalytic converter 208, and subsequently out the external exhaust outlet 210. The catalytic converter 208 may for example be an underbody catalyst arranged to be a specified distance downstream of an exhaust port (not shown) of the engine.

The engine operation includes two major modes, and two transitional modes (although the engine need not necessarily operate under these modes at all times and other modes of operation are possible). Preferred modal a operation of the engine is best shown in FIG. 4, which shows a load speed curve for engine operation. Engine load is represented as Break Mean Effective Pressure (BMEP).

In lean operation mode (indicated by reference numeral A), the engine Is calibrated to operate in lean burn mode, with a stoichiometric coefficient of preferably greater than 1.3. (ie: The stoichiometric coefficient is 1 for a stoichiometric air-fuel ratio, greater than 1 for a lean air-fuel ratio, and less than 1 for a rich air-fuel ratio.) In the stoichiometric ratio mode (indicated by reference numeral C), the air-fuel ratio is maintained at a substantially stoichiometric level with a stoichiometric coefficient of substantially 1.0. Preferably exhaust gas is re-circulated to the combustion chambers to comprise greater than 25% by mass of the gas in the chamber under lean modes of operation and preferably no greater than 40%. The amount of exhaust gas increasing as the air fuel ratio gets leaner. Exhaust gas may also be re-circulated to the combustion chambers in stoichiometric modes of operation, however dual injection of fuel, as detailed further herein, is preferably employ Engine operation is preferred in either one of these major modes of operation, however, a first transition mode (indicated by reference numeral B) may be required when transferring between stoichiometric mode C and lean mode A. A transitional peak mode (indicated by reference numeral D) may also be provided, and is used for specific high load operation for generally temporary operation using a fuel rich air-fuel ratio (stoichiometric coefficient less than 1).

During the lean mode operation A, the temperature of the exhaust gas at the entry to the main catalyst 208 is preferably in the range of 200 to 400 degrees Celsius. In stoichiometric operation C, the temperature of the exhaust gas at the entry to the main catalyst 208 is typically above 400 degrees Celsius. Conveniently, in this latter mode of operation, the engine can be controlled by way of a dual injection strategy such as that disclosed in the Applicants' International Patent Application No. PCT/AU98/01004, the contents of which are included herein by reference.

Control of the system can be performed in two different ways. Firstly, the mode of the engine can be controlled on the basis of the known or estimated temperature of the exhaust gas. In this case, a sensor 214 can provide information to the engine management system for the purposes of controlling the engine operation appropriately. Secondly, the temperature of the exhaust gas can be controlled to fit the mode of operation under which the engine is currently operating or is desired to operate. Exhaust gas temperature may be controlled, for example, by varying ignition timings from cycle to cycle (corresponding variations of fuelling level may also be required). Of course, a combination of these two methods of control can also be used.

The main catalytic converter 208 is a three way converter which catalytically treats hydrocarbons, carbon monoxide gases and nitrous oxides. The Applicant has found that a Pt—Rh—Ba catalytic converter is particularly useful, and specifically has found that the characteristics of a Johnson-Matthey development version D2681/JM370 provides especially good results. This catalytic converter has a ratio of Pt:Rh of 10:1 in the catalytically active part of the converter. The catalytic converter also has a small proportion of Ba therein.

It is believed that the operation of the engine 200 in mode A so as to promote exhaust gases with a lean air fuel ratio and relatively lower gas temperatures supports a selective NOx reduction process that is not typically supported by a normal 3 way catalyst. It is further believed that this selective NOx reduction process is further supported by the presence of a Pt rich catalytic converter, and perhaps still further by the presence of some Ba on the converter. This selective NOx reduction process promotes the reduction of NOx emissions down to the less harmiful components such as $N_2O$, $N_2$ and $O_2$. Alternate theory suggests that the Ba may, at least in part, provide NOx adsorption capabilities, and may even act as a catalyst commonly referred to as a Lean NOx Trap (LNT) or Lean NOx Catalyst (LNC). This allows some of the NOx to be stored for conversion into less harmful emissions when the engine operates in mode C as described in greater detail herein.

In mode C, the engine 200 is controlled in such a way to take advantage of the high conversion efficiencies that the catalyst converter 208 can provide under stoichiometric operating conditions, these conditions being synonymous with higher exhaust gas temperatures and higher load operating by points.

The use of the close coupled catalytic converter 206 as illustrated in FIG. 3 can increase the effectiveness of the overall emission reduction process by oxidising hydrocarbon and carbon monoxide emissions under conditions which produce lower temperature exhaust gases (for example, the lean mode operation) as the temperature of the exhaust gases immediately adjacent the engine are significantly greater than downstream at the main catalytic converter 208. The reason this is beneficial is that these emissions (hydrocarbons and carbon monoxide) are more efficiently catalysed at higher temperatures. The combined lean stratified and stoichiometric NOx treatment according to the present embodiment enables some of the potential problems of prior art systems and in particular NOx storage type methods to be avoided as the catalyst may be purged of NOx by operating the engine under stoichiometric conditions.

In an alternate embodiment, a three way catalyst may be re-located from a close coupled position to an underbody position. An underbody position is a position remote from the engine bay and associated fire wall, and is typically between the ground and the underside of the floor of the vehicle. In this instance the three way catalyst is preferable located in a position adjacent a catalyst having NOx adsorbent properties, such as a catalyst having Ba as a constituent. Preferably, the catalyst having NOx adsorbent properties operates additionally as a three way catalyst. The three way catalyst that has been re-located to an underbody position is preferably located in a single canister together with the catalyst having NOx adsorbent properties. Preferably the three way catalyst is located at the inlet of the canister and the catalyst with NOx adsorbent properties is located at the outlet of the canister. Locating the three way catalyst adjacent the inlet of the canister allows the three way catalyst to be heated by the exhaust gasses emitted from the engine. This transfer of heat to the three way catalyst also serves to cool the exhaust before it flows through the catalyst with NOx adsorbent properties. In this way both the three way catalyst and the catalyst with NOx adsorbent properties are generally maintained within their respective windows of operational temperatures. Some control of the engine may be required to achieve this. Specifically control of variables such as fuel per cycle and ignition timing may also be implemented to maintain exhaust gas temperatures in a range sufficient to keep the catalysts in their operational temperature windows. As the three way catalyst is now located in an underbody position it is preferable that it is rapidly heated at starting of the engine. Such heating being commonly referred to as a light off strategy and may be achieved through use of a heating element such as a resistive heating element or by use of exhaust gases as detailed in the Applicants U.S. Pat. No. 5,655,365 or any other suitable means. It has been found that optimum results may be achieved by location of the underbody catalyst a distance of between 1.0 m and 1.5 m along the exhaust system from the engine.

In a further embodiment, the three way catalyst and catalyst with NOx adsorbent properties form separate parts of the same three way catalyst brick. The catalyst with NOx adsorbent properties forming that part of the brick to which Ba is added.

With these arrangements, the catalyst with the NOx adsorbent properties may be regenerated by operating the engine with a stoichiometric air fuel ratio (note: regeneration of a NOx adsorbent catalyst is often referred to as "purging" the catalyst).

It is preferable that when operating the engine in mode A, ie lean mode, that the combustion chamber gas comprise 25% or more EGR by mass. EGR being an acronym for Exhaust Gas Re-circulation. EGR means re-circulation of some of the exhaust gasses into the inlet manifold of the engine and hence into the combustion chambers of the engine.

Preferably the combustion chamber gases comprise between 25% and 40% EGR by mass with the percentage of EGR increasing as the air fuel ratio increases (ie as the air fuel ratio gets more lean).

By maintaining the engine out NOx to a level of approximately twice the Euro III tail pipe emissions, the applicant has found the above referenced three way catalyst with NOx adsorbent properties to be particularly effective. It is believed that with PGM (precious group metals—ie Pt, Pd, Rh etc) loadings that are relatively standard for manifold port injected vehicles, engine out NOx emissions of between three and four times Euro III may be emitted whilst the catalyst will still be effective for meeting Euro III requirements. Such a catalyst having an engine swept volume (ESV) of less than 150% and preferably less than 110%. It is believed that engine out CO emissions should at the same time be in the order of three times or less Euro III emissions in order to meet Euro III emissions requirements. Further it is believed that the engine out HC emissions should be in the order of ten times or less Euro III emissions in order to meet Euro III emissions. Preferably the engine is calibrated across its speed load range so that its emissions do not to exceed these limits over a particular drive cycle. This may require that when the engine is operated in a lean mode that the air fuel ratio correspond with a lambda value no less than 1.3. More over as the lambda value increases, the ECR percentage should also generally increase to a limit of approximately 40%. In some circumstances, an air fuel ratio corresponding to a lambda of between 1.0 and 1.3 may be selected when transitioning between a lean air fuel ratio operating point and a stoichiometric air fuel ratio operating point.

Selection of whether a load point should be lean or stoichiometric, and if lean, the limit to which it can be lean is generally determined for an engine during calibration. A trade off between lean operation, power requirements, NOx levels and levels of other emissions will be required. However, to meet Euro III and Euro IV requirements at least, it is believed that lean operating points should be calibrated to have ISNOx (Indicated Specific NOx) emissions levels in the range between 0.7 and 2.0 grams per kilowatt hour in order for a three way catalyst with some NOx adsorbent properties to be utilised. It is believed that by calibrating the engine so that the emissions are maintained in the above bounds that PGM loadings similar to current MPI vehicles may be utilised. Optimally, the catalyst may have a size of less than 150% ESV (engine swept volume) and preferably less than 110% ESV. This range of calibration points is believed to provide optimum operation of an engine capable of generating engine out NOx of approximately one and one half times Euro III levels, three times Euro III CO levels and ten times Euro III HC levels. Calibration with lower NOx levels may be possible, however a larger three way catalyst may be required and fuel consumption may also deteriorate. Hence it is believed that the above range of ISNOx in combination with an exhaust treatment system having a three way catalyst and a catalyst having some NOx adsorbent properties provides an optimum configuration for meeting Euro III and/or Euro IV emissions targets.

Figure 5:
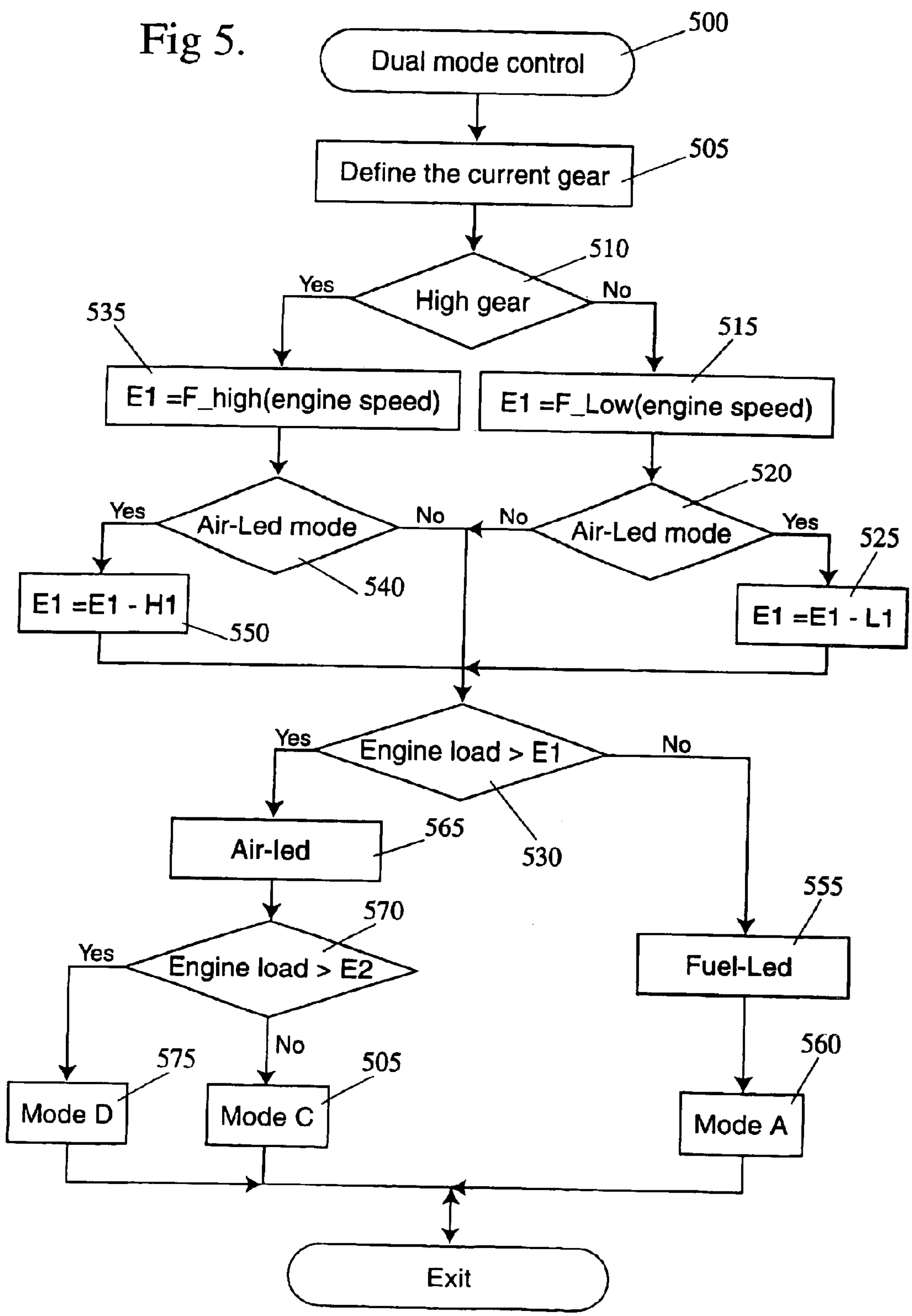
FIG. 5 is a flow chart describing how selection between the various modes of operation detailed in FIG. 4 may be effected.

Selection between air fuel ratio and modes A, B, C and D is demonstrated with reference to the dual mode strategy detailed in FIG. 5 which may be executed by an electronic control unit (ECU) of the engine. The dual mode strategy commences at step 500 whereupon it proceeds to step 505 where the current gear of the vehicle is identified, typically, first second, third, fourth or fifth for a manual passenger vehicle. Having determined the current gear, the process proceeds to step 510 which decides to branch to step 515 if the gear identified is a low gear, typically first and second, and to branch to step 535 if the gear is a high gear, typically third gear or higher. At step 515 a variable E1, which is an engine load threshold value is set to a predetermined level corresponding to F_Low. This value indicates the boundary between modes B and C in FIG. 4. The process then proceeds to step 520 where it determines whether or not the engine is currently operating in an air led mode (typically stoichiometric or rich air fuel ratio and corresponding to high load demand) or a fuel led mode (typically lean air fuel ratio corresponding to low load demand). If the engine is operating in an air led mode then the process moves to step 530, otherwise it moves to step 525 and the value of E1 is reduced by an amount L1, which is a low gear hysteresis number which defines a hysteresis band for transitioning from an air led mode to a fuel led mode (ie, a hysteresis for engine loads when moving from Mode C to Mode A) under low gear operating conditions, after which the process moves to step 530.

Returning to step 510, if the vehicle is in a high gear then the process moves to step 535 and the engine load threshold variable "E1" is set to F_High, being a high load value. The process then moves to step 540 where it is determined whether or not the engine Is currently operating with an air led mode or a fuel led mode. If it is operating with an air led mode then the process moves to step 530, otherwise the process moves to step 550 where the engine load threshold value is reduced by the high gear hysteresis number which defines a hysteresis band for transitioning from an air led mode to a fuel led mode (ie, a hysteresis for engine loads when moving from Mode C to Mode A) under high gear operating conditions, after which the process moves to step 530.

At step 530 the process determines whether or not the current engine load is greater than the current engine load threshold E1. If it is not, then the process moves to step 555 and a fuel led (or lean air fuel ratio) is identified and the engine operates in mode A.

If at step 530 the current engine load is greater than the current engine threshold value E1 then the process moves to step 565 and operation an air led mode is identified. The process then moves to step 570 where if the engine load is greater than engine threshold value E2 then the engine operates in Mode D, which is a mode with rich air fuel ratios. If however at step 570 the current engine load is identified as being less than E2 ten the process moves to step 580 which corresponds with Mode C, ie a stoichiometric air fuel ratio.

In preferred embodiments, an additional step 585 may be introduced intermediate step 570 and step 580. This step may determine whether or not the exhaust gas is within a predetermined range, such as range suitable for efficient operation of a catalyst with NOx adsorbent characteristics. If it is within this range, then the process may then operate at additional step 590 in Mode B.

In a further embodiment, the catalyst with NOx adsorbent properties may be regenerated at a sufficient rate when operating the engine with a stoichiometric air fuel ratio (ie lambda=1.0) that saturation of the catalyst can be avoided. This allows the engine to operate under typical driving conditions such that a NOx sensor may not be required. As such the air fuel ratio for engine load conditions may be selected independently of NOx stored on the catalyst or calculated as stored on the catalyst. This is because the engine load will typically dictate stoichiometric or rich operating conditions from time to time. As such, this intermittent operation at these lower air fuel ratios, as occurs under typical vehicle operating conditions, will often be sufficient to maintain the catalyst in a non-saturated state.

Alternately, the catalyst may be monitored, either directly by a NOx sensor or indirectly by some other means, such as an exhaust gas temperature sensor. Where it is monitored directly, the engine can be operated by selecting a stoichiometric air fuel ratio from time to time so as to ensure that the catalyst does not saturate. Such an arrangement having an advantage that the fuel economy is not greatly penalised as may be the case where the engine is operate with a rich air fuel ratio.

Indirect monitoring of the NOx stored on the catalyst may be achieved by a cumulative measure of NOx emitted from the engine. This may be achieved by monitoring the engine operating conditions over a period of time. For example the period of time that the engine has spent at various operating points. If it is known the amount of NOx that is likely to be emitted at these operating points then the amount of NOx can be estimated. These operating points may be identified as either one of engine speed or engine load or both. In these circumstances, the engine may be deliberately operated with a stoichiometric air fuel ratio, even though a lean air fuel ratio may be sufficient for current engine operating conditions, so as to regenerate the NOx adsorbent catalyst.

Alternate methods of estimating when to have stoichiometric excursion from a lean mode of operation so as to regenerate the catalyst may be employed. For example, the amount of time since a stoichiometric excusion last occurred or the amount of time since the engine last operated with a stoichiometric operating condition for a period of time to purge the catalyst of a significant proportion of the NOx adsorbed thereto.

The method according to the present invention is applicable to both two stroke and four stroke engines incorporating direct injection systems and particularly those operation with a dual fluid fuel injection system. Modifications and variations as would be deemed obvious to the person skilled in the art are included within the ambit of the present invention.

What is claimed is:

1. A method of treating NOx emissions in the exhaust gas of an internal combustion engine having catalyst means including at least a first catalyst converter capable of treating NOx, said converter including a combination of Pt, Rh and Ba elements wherein the ratio of Pt to Rh is about 10:1 and the proportion of Ba is relatively low compared to the proportions of Pt and Rh, the method including operating the engine in a first mode to promote a first set of conditions and in a second mode to promote a second set of conditions, wherein the first set of conditions include exhaust gases at an exhaust gas temperature in the range of 200 to 400 degrees Celsius, and wherein the first mode of operation includes operating the engine with a lean air-fuel ratio, and the second mode of operation includes operating the engine with a stoichiometric air-fuel ratio, the method further including controlling the operation of the engine during the first mode so as to promote a selective catalyst NOx reduction process at the first catalytic converter, and controlling the temperature of the exhaust gas to be in the range of 200–400 degrees Celsius by operation of the engine to ensure effective operation of the first catalyst converter under the first mode of operation.

2. A method according to claim 1, wherein the second set of conditions include exhaust gases at a temperature greater than 200 degrees Celsius.

3. A method according to claim 2, wherein the exhaust gas temperature is greater than 400 degrees Celsius.

4. A method according to claim 1, including measuring the exhaust gas temperature at the first catalyst converter.

5. A method according to claim 1, including controlling the temperature of the exhaust gas temperature of the engine by appropriate operation of the engine to ensure effective operation of the first catalyst converter under the second mode of operation.

6. A method according to claim 5, including controlling the exhaust gas temperature to be greater than approximately 400 degrees Celsius.

7. A method according to claim 1, wherein the operation of the engine is controlled during the first mode so as to generate the exhaust gas emissions having characteristics that can support acceptable levels of NOx conversion within the first catalyst converter.

8. A method according to claim 1, wherein the first catalyst converter includes a combination of Pd, Rh and Ba elements.

9. A method according to claim 1, wherein the proportion of Pt is greater than for a typical three way catalyst.

10. A method according to claim 1, including controlling the operation of the engine during the second mode so as to promote high NOx conversion efficiency levels within the first catalytic converter.

11. A method according to claim 10, including operating the engine in the first mode when the sensed temperature is between 200 to 400 degrees Celsius, and operating the engine in the second mode when the sensed temperature is greater than 400 degrees Celsius.

12. A method according to claim 1, wherein the catalyst means includes a second catalyst converter provided in a close coupled configuration with the engine for the purpose of oxidizing hydrocarbon and carbon monoxide emissions in the exhaust gas.

13. A method according to claim 1, wherein the first catalyst converter is a three way catalyst.

14. A method according to claim 1, wherein the engine is directed injected.

15. A method according to claim 14, wherein the engine has a two fluid fuel injection system.

16. An engine exhaust system for treating NOx emissions in the exhaust gas of an internal combustion engine, including catalyst means having at least a first catalyst converter capable of treating NOx, said converter including a combination of Pt, Rh and Ba elements wherein the ratio of Pt to Rh is about 10:1 and the proportion of Ba is less than the proportions of Pt and Rh, wherein the engine exhaust system is adapted to at least selectively reduce a portion of the NOx emissions when the engine is operated in a first mode and a first set of conditions are promoted, wherein the first set of conditions include exhaust gases at an exhaust gas temperature in the range of 200 to 400 degrees Celsius, and the first mode of operation includes operating the engine with a lean air-fuel ratio, and controlling the temperature of the exhaust gas to be in the range of 200–400 degrees Celsius by operation of the engine to ensure effective operation of the first catalyst converter under the first mode of operation.

17. An engine exhaust system as claimed in claim 16 for use with direct injection engine whereby said first mode of operation is promoted.

18. An engine as claimed in claim 17 wherein said direct injection engine utilizes an air assisted direct injection fuel system.

19. An engine operating system according to claim 16, wherein the first catalyst converter includes a combination of Pd, Rh and Ba elements.

20. An engine exhaust system according to claim 16, wherein the proportion of Pt is greater than for a typical three way catalyst.

21. An engine exhaust system according to claim 16, including a temperature sensing device provided in the exhaust system of the engine for measuring the exhaust gas temperature.

22. An engine exhaust system according to claim 21, wherein the temperature sensing device is located at the first catalyst converter.

23. An engine exhaust system according to claim 21, wherein the engine is operated in the first mode when the sensed temperature is between 200 to 400 degrees Celsius, and the engine is operated in the second mode when the sensed temperature is greater than 400 degrees Celsius.

24. A method according to claim 16, wherein the catalyst means includes a second catalyst converter provided in a close coupled configuration with the engine for the purpose of oxidizing hydrocarbon and carbon monoxide emissions in the exhaust gas.

25. A method according to claim 16, wherein the first catalyst converter is a three way catalyst.

26. An internal combustion engine in combination with the exhaust system according to claim 16, wherein said engine has a fuel injection system which facilitates operation of said engine with a plurality of air fuel ratios in a range between lean and substantially stoichiometric and said engine having an electronic controller for controlling operation of said engine and for selecting said substantially stoichiometric air fuel ratio to purge Nox stored in said exhaust treatment system, wherein said electronic controller selects and stoichiometric air fuel ratio at least as a cumulative measure of emissions transmitted to the exhaust treatment system.

27. An internal combustion engine as claimed in claim 26 wherein said cumulative measure is determined from engine operating conditions over a predetermined period of time.

28. An internal combustion engine as claimed in claim 27 wherein said operating conditions is at least one of engine speed and/or engine load.

29. An internal combustion engine as claimed in claim 27 where said predetermined period of time is elapsed time since said engine operated with a stoichiometric air fuel ratio.

30. An internal combustion engine as claimed in claim 29 wherein said predetermined period of time is elapsed time since said engine operate with a stoichiometric air fuel ratio for a period sufficient to substantially purge said catalyst of stored NOx.

31. An internal combustion engine as claimed in claim 26 wherein said cumulative measure is an estimate based on emission levels emitted at each selected air fuel ratio.

32. An internal combustion engine as claimed in claim 26 wherein said cumulative measure is based on the amount of time said engine was operated at each selected air fuel ratio.

33. An internal combustion engine as claimed in claim 26 wherein said stoichiometric air fuel ratio is selected for a period sufficient to regenerate said exhaust treatment system from stored NO, and wherein subsequent to said period sufficient to regenerate said exhaust treatment system said electronic controller selects an air fuel ratio dependent on prevailing engine conditions.

34. An internal combustion engine as claimed in claim 26 wherein said electronic controller select said stoichiometric air fuel ratio in response to a sensing means operatively arranged with respect to the exhaust treatment system which is able to provide an indication on the amount of NOX stored therein.

35. An internal combustion engine as claimed in claim 34 wherein said electronic controller only selects said stoichiometric air fuel ratio in response to a signal from said sensing means that purging of NOx from the exhaust treatment system is required.

36. An internal combustion engine as claimed in claim 34 wherein said selection of said stoichiometric air fuel ratio by the electronic controller to effect purging of NOX from the exhaust treatment system is also dependent on the volume of a catalyst in the exhaust treatment system.

37. An internal combustion engine as claimed in claim 26 wherein said engine is a direct injection engine.

38. An internal combustion engine as claimed in claim 26 wherein said engine is a dual fluid direct injection engine.

39. An internal combustion engine and exhaust treatment system as claimed in claim 26 said exhaust treatment system comprising at least one catalyst having three way conversion capability and NOx storage capability, wherein the amount of NOx emitted by said engine to said exhaust treatment system over a Euro III drive cycle is no more than four times the Euro III requirement whereby said exhaust treatment system has emissions of NOx, carbon monoxide and hydrocarbons less than said Euro III requirement over said Euro III drive cycle, and the volume of the catalyst is less than 150% of the swept volume of said engine.

40. An internal combustion engine and exhaust treatment system as claimed in claim 39 wherein said catalyst has substantially two zones, a first of which has said three way conversion capability and a second of which has at least said NOx storage capability.

41. An internal combustion engine and exhaust treatment system as claimed in claim 40 wherein said second zone of said catalyst has three way conversion capability in addition to said NOx storage capability.

42. An internal combustion engine and exhaust treatment system as claimed in claim 40 wherein said first zone is located so as to received exhaust emissions from said engine before said second zone.

43. An internal combustion engine and exhaust treatment system as claimed in claim 39 wherein said exhaust treatment system has a single canister for locating said at least one catalyst, said canister located remotely from an exhaust port of said engine and not within an engine compartment in which the engine is installed.

44. An internal combustion engine and exhaust treatment system as claimed in claim 43 wherein single canister is located in an underbody location and has dimensions of less than 150% of the swept volume of the engine.

45. An internal combustion engine and exhaust treatment system as claimed in claim 39 wherein exhaust emissions generated by said engine when operated with a substantially stoichiometric air fuel ratio operate to purge NOx stored in said exhaust treatment system during said Euro III drive cycle.

46. An internal combustion engine and exhaust treatment system for a vehicle as claimed in claim 39 wherein the amount of carbon monoxide emitted by said engine to said exhaust treatment system over said Euro III drive cycle is no more than three times the Euro III requirement.

47. An internal combustion engine and exhaust treatment system as claimed in claim 39 wherein the amount of hydrocarbons emitted by said engine to said exhaust treatment system over said Euro III drive cycle is no more than ten times the Euro III requirement.

48. An internal combustion engine and exhaust treatment system as claimed in claim 39 wherein the amount of NOX emitted by said engine to said exhaust treatment system over said Euro III drive cycle is no more three times the Euro III requirement.

49. An internal combustion engine and exhaust treatment system as claimed in claim 39 wherein for substantially all of the lean air fuel ratios, said engine operates with EGR levels of 25% by mass or greater.

50. An internal combustion engine and exhaust treatment system as claimed in claim 39 wherein in operation said catalyst is heated by alight off strategy.

51. An internal combustion engine and exhaust treatment system as claimed in claim 50 wherein said light off strategy comprises late combustion of fuel whilst an exhaust port of said engine is open whereby said catalyst receives exhaust emissions of an elevated temperature.

52. An internal combustion engine and exhaust treatment system as claimed in claim 51 wherein late combustion of fuel comprises a quantity of fuel in addition to a quantity required for operation of said engine independent of said light off strategy.

53. An internal combustion engine and exhaust treatment system as claimed in claim 39 wherein said engine is a direct injection engine.

54. An internal combustion engine and exhaust treatment system as claimed in claim 39 wherein said engine is a dual fluid direct injection engine.

55. A method according to claim 1, wherein the engine operates in said first mode with EGR levels of 25% by mass or greater.

56. A method according to claim 1, wherein the catalyst is heated by a light off stategy.

57. A method according to claim 56, wherein said light off strategy comprises late combustion of fuel whilst an exhaust port of said engine is open whereby said catalyst receives exhaust emissions of an elevated temperature.

* * * * *